United States Patent [19]

Yaeo et al.

[11] Patent Number: 4,565,720
[45] Date of Patent: Jan. 21, 1986

[54] PACKAGING BAG

[75] Inventors: Kenta Yaeo; Shinji Kawamura; Yoshiyuki Mihara, all of Sodegaura, Japan

[73] Assignee: Idemitsu Petrochemical Co., Ltd., Tokyo, Japan

[21] Appl. No.: 517,765

[22] Filed: Jul. 27, 1983

[51] Int. Cl.$^4$ .............................................. B32B 7/02
[52] U.S. Cl. .................................... 428/35; 428/349; 428/516; 428/518; 428/520
[58] Field of Search ................. 428/517, 35, 516, 349, 428/518, 520

[56] References Cited

U.S. PATENT DOCUMENTS 3,508,944  4/1970  Henderson et al. ................ 428/516
4,303,710  12/1981 Bullard et al. ....................... 428/35

FOREIGN PATENT DOCUMENTS 104380  2/1982  Japan .

Primary Examiner—George F. Lesmes
Assistant Examiner—P. R. Schwartz
Attorney, Agent, or Firm—Frishauf, Holtz, Goodman & Woodward

[57] ABSTRACT

A packaging bag either of two layer structure comprising an outer layer and an inner layer or of three layer structure comprising an outer layer, an intermediate layer, and an outer layer is disclosed, wherein the outer layer is made of a low density ethylene-based polymer or a mixture of said ethylene-based polymer and an ethylene-vinyl acetate copolymer, and the inner or intermediate layer is made of a mixture of high density polyethylene and an ethylene-α-olefin copolymer. The packaging bag of this invention is much superior in film puncture strength, tear strength, etc. to conventional bags and moreover shows very high seal strength and low temperature impact resistance. Thus, the packaging bag of this invention is suitable for storage and conveyance of heavy materials, particularly angular heavy materials such as fowl. Moreover, the packaging bag has good anti-block properties and thus is suitable for automatic packaging.

29 Claims, No Drawings

PACKAGING BAG

FIELD OF THE INVENTION

The invention relates to packaging bags, and more particularly to packaging bags which have high mechanical strength and are superior in low temperature impact resistance, heat-sealing properties, blocking resistance, etc. and moreover suitable for automatic packaging.

BACKGROUND OF THE INVENTION

Low density and high density polyethylene films have been used as heavy-duty bags for packaging granular materials such as rice and wheat, powdery materials such as fertilizer and feed, and angular solid materials such as fowl. These films, however, suffer from various disadvantages; for example, the low density polyethylene film is necessary to be increased in thickness because of its poor mechanical strength, and the high density polyethylene film is not satisfactory in sealing properties and strength against angular products and moreover inferior in appearance.

In order to overcome the foregoing problems, a bag has been developed which is made of a laminated film comprising low density and high density polyethylene films (see Japanese Patent Application Laid-Open Nos. 30994/1980 and 92023/1981). However, the bag described in Japanese Patent Application Laid-Open No. 30994/1980 is readily subject to blocking because its inner layer is made of low density polyethylene, and has the problems that it is difficult to open and the inner surfaces of the bag can slide only with difficulty. The bag described in Japanese Patent Application Laid-Open No. 92023/1981 is inferior in a film puncture strength, tear strength, impact resistance at low temperatures, and so forth and is not suitable for packaging and conveying angular heavy materials.

SUMMARY OF THE INVENTION

An object of the invention is to provide a packaging bag freed of the above-described disadvantages.

The present invention, in one embodiment, relates to a packaging bag comprising an outer layer of a low density ethylene-based polymer or a mixture of said ethylene-based polymer and an ethylene-vinyl acetate copolymer, and an inner layer of a mixture of high density polyethylene and an ethylene-α-olefin copolymer, and in another embodiment, to a packaging bag comprising two outer layers and an intermediate layer sandwiched between said outer layers, the outer layers each being made of a low density ethylene-based polymer or a mixture of said ethylene-based polymer and an ethylene-vinyl acetate copolymer, and the intermediate layer being made of a mixture of high density polyethylene and an ethylene-α-olefin copolymer.

DETAILED DESCRIPTION OF THE INVENTION

The packaging bag of the invention is either of two layer structure comprising an outer layer and an inner layer or of three layer structure comprising two outer layers and an intermediate layer sandwiched therebetween. In the latter three layer structure, the outer layers may be made of the same polymer or made of different polymers.

The present invention will hereinafter be explained in greater detail.

The outer layer or layers of the bag of the invention are made of a low density ethylene-based polymer (hereinafter sometimes referred to as "LDPE") or a mixture of LDPE and an ethylene-vinyl acetate copolymer (hereinafter sometimes referred to as "EVA").

Low density ethylene-based polymers as used herein usually have a density of from 0.91 to 0.94 gram per cubic centimeter, the range of from 0.915 to 0.938 gram per cubic centimeter being preferred, and a melt index (MI) of from 0.1 to 20 grams per ten minutes, the range of from 0.2 to 10 grams per ten minutes being preferred. Any of high pressure-produced and middle or low pressure-produced low density ethylene-based polymers can be used. Middle or low pressure-produced low density ethylene-based polymers include copolymers of ethylene and α-olefins containing from 3 to 12 carbon atoms. Examples of such α-olefins are propylene, butene-1, pentene-1, hexene-1, 4-methylpentene-1, octene-1, and nonene-1. The α-olefin content of the copolymers is appropriately from 1 to 20% by weight.

In the case of the LDPE-EVA mixture, the weight ratio of LDPE to EVA is usually from 10:90 to 95:5 and preferably from 60:40 to 90:10. When the amount of EVA is too large, the resulting bag has acetic acid odor and moreover, the surface loses its smoothness excessively, resulting in blocking between bags and a serious reduction of workability due to sticking to conveying means, such as a roller and a belt of a belt conveyer, as used in automatic packaging.

The inner layer or the intermediate layer of the bag of this invention is composed, as described hereinbefore, of high density polyethylene (hereinafter sometimes referred to as "HDPE") and an ethylene-α-olefin copolymer.

High density polyethylenes as used herein have a density of from 0.94 to 0.97 gram per cubic centimeter, preferably from 0.945 to 0.965 gram per cubic centimeter, and MI of from 0.01 to 4.0 grams per ten minutes, preferably from 0.02 to 2.0 gram per ten minutes. Any high density polyethylene with a density and MI falling within the foregoing ranges can be used appropriately depending on the purpose for which the packaging bag is used. For example, those polyethylenes with a melt flow rate (MFR) of from about 10 to 200 (MFR is used as a measure of molecular weight distribution of HDPE) can be used. The "MFR" is defined as follows:

$$MFR = \frac{MI_{21.6\,kg}}{MI_{2.16\,kg}}$$

(wherein $MI_{21.6}$ kg represents a melt index at a load of 21 6 kilograms, and $MI_{2.16}$ kg' a melt index at a load of 2.16 kilograms).

It is desirable for HDPE to be chosen appropriately depending on the purpose for which the packaging bag is used. In applications for which a high strength is needed, HDPE with MFR of at least 80 is used, and in applications in which transparency and moisture permeability are required, HDPE with MFR of from 10 to 60, preferably from 15 to 50 is used.

Ethylene-α-olefin copolymers which can be used are those copolymers having the same density and MI and containing α-olefin with from 3 to 12 carbon atoms in the same amount as the ethylene-α-olefin which is used as a component of the outer layer described above. They may be the same as or different from those used in the outer layer. These ethylene-α-olefin copolymers include ethylene-propylene-based copolymer elastomers (hereinafter sometimes referred to as "EPR"). EPR includes, as well as ethylene-propylene rubber, ethylene-propylene terpolymers containing dienes such as 5-ethylidene-2-norbornen, divinylbenzene, 1,4-hexadiene, dicyclopentadiene, and cyclooctadiene, as a third component. EPR preferably has a Mooney viscosity of from 40 to 150.

The ratio of HDPE to the ethylene-α-olefin copolymer in the HDPE/ethylene-α-olefin copolymer mixture can be determined appropriately taking into account the purpose for which the packaging bag is used and so forth; the HDPE content is usually from 95 to 50% by weight and preferably from 90 to 60% by weight, and the ethylene-α-olefin copolymer content is usually from 5 to 50% by weight and preferably from 10 to 40% by weight. When the ethylene-α-olefin copolymer content is less than 5% by weight, the resulting film is reduced in puncture strength and seal strength and, when a bag prepared by using the film is dropped, it is easily torn. On the other hand, when it is more than 50% by weight, processability becomes low, and a bag prepared by using the resulting film has poor stiffness and is not suitable for practical use.

In the case of the bag prepared by using the two layer film, the ratio in thickness of the outer layer to the inner layer can be determined appropriately depending on the use of the bag and so forth; usually, it is controlled within the range of from 1/99 to 60/40. When the thickness of the outer layer exceeds 60% of the total thickness, the resulting bag is inferior in tensile strength and rigidity. On the other hand, when it is less than 1% of the total thickness, processability is reduced. When the bag of the invention is prepared by a film of three layer construction comprising outer layers and an intermediate layer sandwiched therebetween, the thicknesses of the layers are controlled so that each outer layer constitutes from 1 to 40% of the total thickness, and the intermediate layer, from 20 to 98% and preferably from 40 to 90%. When the thickness of the outer layer is increased, the intermediate layer is correspondingly decreased in thickness, leading to a reduction in the mechanical strength of the bag. However, if the thickness of the outer layer is extremely decreased, the processability of the film becomes difficult.

In the packaging bag of the invention, other layers can be laminated, if necessary, to the above-described layers. For example, LDPE, HDPE, an ethylene-unsaturated ester copolymer, e.g., EVA, and the like can be provided in a film form at a suitable location (e.g., between the intermediate layer and the outer layer, or on the outside of the outer layer).

The bag of the invention can be produced by various techniques. For example, feed resin for the preparation of the layers are each melted and kneaded in respective extruders at usual processing temperature and extruded therefrom, and then the resulting extruded resins are introduced into a circular die and bonded together inside the die. Thereafter, the inflation processing of the resulting laminated film is performed at a blow ratio of from 1.2 to 8, preferably from 1.5 to 6 to obtain a tubular layer film from which the bag of the invention is produced. The layers can be bonded together either inside or outside the die. However, it is preferred to bond together the layers inside the die since the bonding strength between the layers can be increased. In the production of the bag of the invention, if desired, additives such as a pigment, a slip agent, an antioxidant, an antistatic agent and a weather resistance-improving agent may be incorporated into each layer at any processing step.

As compared with conventional bags, the bag of the invention is greatly superior in film puncture strength, tear strength, and so forth, and moreover, its seal strength and impact resistance at low temperature are very high. Thus, the bag of the invention can be used satisfactorily to accommodate therein and transfer heavy materials, particularly heavy angular materials such as fowl. Since the bag of the invention shows good anti-block properties and is of high stiffness, it is suitable for use in automatic packaging. Moreover, because of high mechanical strength, the bag of the invention can be reduced in thickness; the thickness is sufficient to be from about 10 to 200 $\mu$. Furthermore, the bag of the invention is superior in printing properties. These advantages can be attained more efficiently with the bag of the three layer structure. The bag of the three layer structure can be reduced in thickness and is superior particularly in heat sealing properties.

The present invention is explained by the following examples and comparative examples.

In these Examples 1–29, physical tests were carried out according to the following methods.

Impact Resistance: Measured using a film impact tester (manufactured by Toyo Seiki Seisakujo Co. Ltd; specified impact load: 30 kg.cm; impact hammer diameter 25.4 mm)

Puncture Strength: Measured according to JIS-P-8134.

Tear Strength: Measured according to JIS-Z-1702.
Tensile Modulus: Measured according to JIS-Z-1702.
Tensile Strength: Measured according to JIS-Z-1702.
Elongation: Measured according to JIS-Z-1702.
Seal Strength: Measured according to ASTM-D-1822.

Practical Drop Test: A bag was charged with 20 kg of chemical fertilizer and dropped on a concrete floor from a height of 2.5 meters in such a manner that the broad bag surface was horizontal to the floor. The bag-breakage ratio (number of broken bags/number of dropped bags) was determined.

Processability: By observing the continuous operation condition in processing a two layer film by an inflation method, the processability was evaluated on a numeric scale as follows:

3—Excellent, i.e. continuous operation can be performed stably for more than one week.

2—Good, i.e. continuous operation can be performed for 1 to 6 days.

1—Fair, i.e. continuous operation can be performed for 3 to 24 hours.

Appearance: Evaluated by observing with the eye.

Blocking: Evaluated by examining whether or not the inner surfaces of a bag closely stick to each other in opening the bag after the production thereof.

3—The bag can be opened with ease.
2—The bag can be opened with slight difficulty.
1—The bag can be opened with difficulty.

EXAMPLES 1 to 16

Feed resin for an inner layer and feed resin for an outer layer as shown in Table 1 were melted and kneaded in the respective extruders and extruded therefrom, and thereafter, both of the resulting extruded resins were introduced into a circular die having double slit to form two layers which were bonded to each other inside the die. Then, inflation processing was performed at a blow ratio of 4.3 to obtain a tubular two layer film in which the ratio in thickness of the inner layer to the outer layer was 4:1 and the total thickness was 80 microns. From this tubular film was produced a bag having a width of 500 mm and a length of 620 mm wherein one end of the bag was heat-sealed. Physical tests were carried out on the bags, and the results are shown in Table 1.

In Table 1, the plastics materials are identified by single letters as follows:

A: High-pressure-produced LDPE having a density of 0.934 g/cm$^3$ and a MI of 3 g/10 min.

B: High-pressure-produced LDPE having a density of 0.926 g/cm$^3$ and a MI of 0.4 g/10 min.

C: High-pressure-produced LDPE having a density of 0.921 g/cm$^3$ and a MI of 0.6 g/10 min.

D: High-pressure-produced LDPE having a density of 0.917 g/cm$^3$ and a MI of 8 g/10 min.

E. High-pressure-produced LDPE having a density of 924 g/cm$^3$ and a MI of 3 g/10 min. F: Low-pressure-produced LDPE having a density of 0.921 g/cm$^3$, a MI of 3.7 g/10 min, and a C$_8$ α-olefin content of 10.3% by weight.

G: EVA having a density of 0.94 g/cm$^3$, a MI of 0.6 g/10 min, and a vinyl acetate content of 15% by weight.

H: HDPE having a density of 0.954 g/cm$^3$, a MI of 0.05 g/10 min, and MFR 100.

I: Ethylene-propylene copolymer having a Mooney viscosity ML$_{1+4}$ (100° C.) of 60, and a propylene content of 27% by weight.

J: Ethylene-propylene-5-ethylidene-2-norbornene terpolymer having a Mooney viscosity ML$_{1+4}$ (100° C.) of 90 and a propylene content of 28% by weight.

K: Ethylene-propylene-5-ethylidene-2-norbornene terpolymer having a Mooney viscosity ML$_{1+4}$ (100° C.) of 105 and a propylene content of 43% by weight.

L: Ethylene-propylene-5-ethylidene-2-norbornene terpolymer having a Mooney viscosity ML$_{1+4}$ (100° C.) of 42 and a propylene content of 43% by weight.

COMPARATIVE EXAMPLES 1 AND 2

A bag was produced in the same manner as in Example 1 except that the inner layer was made of HDPE alone. The bag thus produced was subjected to the same testing as in Example 1. The results are shown in Table 1.

COMPARATIVE EXAMPLE 3

Using a 180-micron thick film made of commercially available low density polyethylene (density: 0.926 gram per cubic centimeter; MI: 0.4 gram per ten minutes) for general heavy duty bags, the same physical testings as in Example 1 were performed. The results are shown in Table 1.

COMPARATIVE EXAMPLE 4

Using a 80-micron thick film made of commercially available low density polyethylene (density: 0.926 gram per cubic centimeter; MI: 0.4 gram per ten minutes) for general heavy duty bags, the same physical testings as in Example 1 were performed. The results are shown in Table 1.

TABLE 1

| | Inner Layer | | | | Outer Layer | | | | Strength of Bag | | | | | |
|---|---|---|---|---|---|---|---|---|---|---|---|---|---|---|
| | HDPE | | EPR | | LDPE | | EVA | | Impact Resistance | Puncture Strength | Tear Strength MD/TD | Tensile Modulus MD/TD | Tensile Strength MD/TD | Elongation MD/TD |
| | Type | wt % | Type | wt % | Type | wt % | Type | wt % | kg·cm | kg·cm | kg/cm | kg/cm$^2$ | kg/cm$^2$ | % |
| Example 1 | H | 95 | J | 5 | B | 100 | — | | 13.0 | 13.0 | 22/35 | 7430/7400 | 390/400 | 460/510 |
| Example 2 | " | 90 | " | 10 | " | " | — | | 13.0 | 48.0 | 40/80 | 6600/6890 | 380/400 | 540/500 |
| Example 3 | " | 80 | " | 20 | " | " | — | | 13.0 | 96.0 | 67/110 | 4810/4960 | 370/360 | 540/500 |
| Example 4 | " | 70 | " | 30 | " | " | — | | 14.0 | 112.0 | 90/110 | 3680/3820 | 350/360 | 570/520 |
| Example 5 | " | 60 | " | 40 | " | " | — | | 15.0 | 148.0 | 120/110 | 3000/3200 | 340/330 | 580/550 |
| Example 6 | " | 50 | " | 50 | " | " | — | | 16.0 | 165.0 | 130/110 | 2500/2700 | 330/320 | 580/550 |
| Example 7 | " | 80 | " | 20 | C | " | — | | 12.0 | 90.0 | 50/90 | 5300/5600 | 370/430 | 510/460 |
| Example 8 | " | " | " | " | A | " | — | | 11.0 | 48.0 | 40/70 | 5320/5680 | 370/420 | 500/450 |
| Example 9 | " | " | " | " | E | " | — | | 11.8 | 48.0 | 45/70 | 5300/5700 | 370/425 | 500/460 |
| Example 10 | " | " | " | " | D | " | — | | 10.0 | 40.0 | 40/60 | 5400/5500 | 370/390 | 510/490 |
| Example 11 | " | " | " | " | F | " | — | | 11.5 | 60.0 | 50/70 | 5300/5800 | 370/400 | 510/490 |
| Example 12 | " | " | K | " | A | " | — | | 11.5 | 50.0 | 50/70 | 5320/5680 | 370/440 | 500/480 |
| Example 13 | " | " | L | " | " | " | — | | 11.0 | 54.0 | 60/70 | 5300/5700 | 340/390 | 510/500 |
| Example 14 | " | " | I | " | " | " | — | | 11.0 | 54.0 | 37/71 | 5780/5960 | 360/360 | 560/620 |
| Example 15 | " | " | " | " | B | " | — | | 13.0 | 60.0 | 60/90 | 5120/5330 | 349/330 | 540/440 |
| Example 16 | " | " | J | " | A | 90 | G | 10 | 11.0 | 60.0 | 45/65 | 5400/5560 | 390/430 | 500/440 |
| Comparative Example 1 | " | 100 | — | | A | 100 | — | | 10.9 | 7.5 | 20/30 | 8660/8070 | 460/570 | 380/450 |
| Comparative Example 2 | " | " | — | | B | " | — | | 13.4 | 8.0 | 22/35 | 8370/8740 | 360/500 | 360/420 |
| Comparative Example 3 | B single layer (180 microns) | | | | | | | | 10.0 | 120 | 30/50 | 3000/3200 | 250/220 | 190/470 |
| Comparative Example 4 | B single layer (80 microns) | | | | | | | | 10.0 | 110 | 20/53 | 2900/3000 | 230/240 | 190/480 |

| | Seal Strength kg·cm | Practical Drop Test (Bag Breakage Ratio) % | Processability | Appearance | Blocking |
|---|---|---|---|---|---|
| Example 1 | 2.0 | 40 | 3 | good | 3 |
| Example 2 | 4.0 | 15 | 3 | good | 3 |
| Example 3 | >4.0 | 0 | 3 | good | 3 |
| Example 4 | >4.0 | 0 | 3 | good | 3 |
| Example 5 | >4.0 | 0 | 2 | good | 3 |

TABLE 1-continued

| | | | | | | |
|---|---|---|---|---|---|---|
| Example 6 | >4.0 | 0 | 1 | good | 3 |
| Example 7 | 4.0 | 0 | 3 | good | 3 |
| Example 8 | 4.0 | 5 | 3 | good | 3 |
| Example 9 | 4.0 | 5 | 3 | good | 3 |
| Example 10 | 4.0 | 25 | 2 | good | 3 |
| Example 11 | 4.0 | 0 | 3 | good | 3 |
| Example 12 | 4.0 | 0 | 3 | good | 3 |
| Example 13 | 4.0 | 0 | 3 | good | 3 |
| Example 14 | 3.5 | 5 | 3 | good | 3 |
| Example 15 | 3.5 | 5 | 3 | good | 3 |
| Example 16 | 4.0 | 5 | 2 | good | 3 |
| Comparative Example 1 | 0.5 | 80 | 3 | good | 3 |
| Comparative Example 2 | 0.5 | 80 | 3 | good | 3 |
| Comparative Example 3 | 3 | 0 | 3 | Fair | 2 |
| Comparative Example 4 | 3 | 100 | 3 | Fair | 2 |

EXAMPLE 17

The bag of Example 3 was charged with 20 kilograms of chemical fertilizer, and was allowed to stand for one day and night in a room maintained at −20° C. and, thereafter, was subjected to the practical drop test to determine the bag breakage ratio. The results are shown in Table 2.

TABLE 2

| | Inner Layer | | | | Outer Layer | | | | Practical Drop Test |
|---|---|---|---|---|---|---|---|---|---|
| | HDPE | | EPR | | LDPE | | EVA | | (Failure Rate) |
| No. | Type | wt % | Type | wt % | Type | wt % | Type | wt % | % |
| Example 17 | H* | 80 | J* | 20 | B* | 100 | — | — | 15 |
| Example 18 | H | 70 | J | 30 | B | 100 | — | — | 0 |
| Comparative Example 5 | H | 100 | — | — | B | 100 | — | — | 85 |
| Comparative Example 6 | | | single layer of B (180 microns) | | | | | | 25 |
| Comparative Example 7 | | | single layer of B (80 microns) | | | | | | 100 |

*Same as in Table 1.

day and night in a room maintained at −20° C. and, thereafter, was subjected to the practical drop test to determine the bag breakage ratio. The results are shown in Table 2.

EXAMPLE 18

The bag of Example 4 was charged with 20 kilograms of chemical fertilizer, and was allowed to stand for one day and night in a room maintained at −20° C. and, thereafter, was subjected to the practical drop test to determine the bag breakage ratio. The results are shown in Table 2.

COMPARATIVE EXAMPLE 5

The bag of Comparative Example 2 was charged with 20 kilograms of chemical fertilizer, and was allowed to stand for one day and night in a room maintained at −20° C. and, thereafter, was subjected to the practical drop test to determine the bag breakage ratio. The results are shown in Table 2.

COMPARATIVE EXAMPLE 6

The bag of Comparative Example 3 was charged with 20 kilograms of chemical fertilizer, and was allowed to stand for one day and night in a room maintained at −20° C. and, thereafter, was subjected to the practical drop test to determine the bag breakage ratio. The results are shown in Table 2.

COMPARATIVE EXAMPLE 7

The bag of Comparative Example 4 was charged with 20 kilograms of chemical fertilizer, and was allowed to stand for one day and night in a room maintained at −20° C. and, thereafter, was subjected to the practical drop test to determine the bag breakage ratio. The results are shown in Table 2.

EXAMPLES 19 TO 23

Feed resin for an outer layer and feed resin for an inner layer as shown in Table 3 were melted and kneaded in the respective extruders and extruded therefrom, and thereafter, both of the resulting extruded resins were introduced into a circular die having double slit to form two layers which were bonded to each other inside the die. Then, inflation processing was performed at a blow ratio of 4.3 to obtain a tubular two layer structure film in which the ratio in thickness of the outer layer to the inner layer was 1:4 and the total thickness of the two layers was 50 microns. One end of the tubular two layer structure film was heat-sealed to produce a packaging bag having a width of 340 mm and a length of 570 mm.

The bag thus produced was subjected to various physical tests in the same manner as in Example 1. The results are shown in Table 3.

In Table 3 the plastics materials are identified by single letters as follows:

M: High-pressure-produced LDPE having a density of 0.924 g/cm³ and a MI of 3.0 g/10 min.

N: Ethylene-octene-1 copolymer having a density of 0.922 g/cm³ and a MI of 2.3 g/10 min.

O: Low-pressure-produced HDPE having a density of 0.955 g/cm³ and a MI of 0.05 g/10 min.

COMPARATIVE EXAMPLE 8

A bag was produced in the same manner as in Example 19 except that the ethylene-α-olefin copolymer was not used as the component of the inner layer. This bag was tested in the same manner as in Example 19, and the results are shown in Table 3.

COMPARATIVE EXAMPLES 9 AND 10

A bag was produced from a 50 micron thick film made of commercially available high pressure-produced low density polyethylene (density: 0.9269 gram per cubic centimeter; MI: 0.4 gram per ten minutes) for general heavy duty bags. Also, a bag was produced from a 80 micron thick film made of the same low density polyethylene as above. These bags were tested in the same manner as in Example 19, and the results are shown in Table 3.

COMPARATIVE EXAMPLE 11

A bag was produced in the same manner as in Example 19 except that the inner layer and the outer layer of the film of Example 21 were exchanged for each other. This bag was tested in the same manner as in Example 19, and the results are shown in Table 3.

EXAMPLES 24 TO 27

Feed resins for outer layer A (corresponding to the innermost layer of the bag), an intermediate layer, and outer layer B (corresponding to the outermost layer) were each melted and kneaded in the respective extruders and extruded therefrom. The resulting extruded resins were introduced into a circular die, in which the layers are bonded each other. Thereafter, inflation processing was performed at a blow ratio of 4.3 to obtain a 50 micron-thick three layer film. The thus-obtained film was tested for various physical properties in the same manner as in Example 1, and the results are shown in Table 4.

COMPARATIVE EXAMPLES 12 TO 15

The procedure of Example 24 was repeated with the exception that the type of the resin for each layer was changed. The results are shown in Table 4.

COMPARATIVE EXAMPLES 16 AND 17

Each of 50-micron thick single layer films of LDPE and LLDPE was tested, and the results are also shown in Table 4.

TABLE 3

| | | Inner Layer | | Tensile Characteristics | | | | | |
|---|---|---|---|---|---|---|---|---|---|
| | Outer Layer | HDPE(O) (wt %) | LLDPE(N) (wt %) | Tensile Strength MD/TD (kg/cm$^2$) | Tensile Modulus MD/TD (kg/cm$^2$) | Elongation MD/TD (%) | Tear Strength MD/TD (kg/cm) | Impact Resistance (kg·cm) | Puncture Strength (kg·cm) |
| Comparative Example 8 | M | 100 | 0 | 450/470 | 9500/8500 | 400/430 | 9.0/52.0 | 18.0 | 25 |
| Example 19 | " | 90 | 10 | 440/460 | 8000/8400 | 420/460 | 11.2/58.2 | 16.2 | 50 |
| Example 20 | " | 80 | 20 | 439/458 | 7220/8190 | 410/510 | 14.3/82.2 | 14.4 | 60 |
| Example 21 | " | 70 | 30 | 421/439 | 6180/6720 | 440/560 | 20.6/77.5 | 13.4 | 65 |
| Example 22 | " | 60 | 40 | 409/415 | 5210/6300 | 460/580 | 29.3/99.3 | 13.1 | 68 |
| Example 23 | N | 70 | 30 | 400/440 | 6200/6500 | 460/580 | 22.4/91.0 | 13.3 | 70 |
| Comparative Example 9 | M | (50 microns) | | 215/250 | 2500/3000 | 210/350 | 35.0/40.5 | 8.5 | 50 |
| Comparative Example 10 | " | (80 microns) | | 220/220 | 3480/3800 | 310/200 | 32.0/60.5 | 12.0 | 68 |
| Comparative Example 11 | O 70 N 30 | M 100 (50 microns) | | 250/270 | 2800/3400 | 250/500 | 35.0/65.0 | 9.1 | 60 |

| | Seal Strength | | Practical Drop Test | | | |
|---|---|---|---|---|---|---|
| | (kg·cm) | Evaluation*1 | (bag breakage ratio) | Blocking*2 Resistance | Processability*2 | Synthetic*3 Evaluation |
| Comparative Example 8 | 0.5 | 1 | 8/10 | 3 | 3 | 1 |
| Example 19 | 2.0 | 2 | 3/10 | 3 | 3 | 3 |
| Example 20 | 3.5 | 3 | 0/10 | 3 | 3 | 3 |
| Example 21 | 7.0 | 3 | 0/10 | 3 | 3 | 3 |
| Example 22 | 7.5 | 3 | 0/10 | 3 | 3 | 3 |
| Example 23 | 7.0 | 3 | 0/10 | 3 | 3 | 3 |
| Comparative Example 9 | 4.0 | 3 | 6/10 | 2 | 3 | 2 |
| Comparative Example 10 | 4.0 | 3 | 0/10 | 2 | 3 | 2 |
| Comparative Example 11 | 3.5 | 3 | 0/10 | 1 | 1 | 1 |

*1 3 ... Excellent, 2 ... Good, 1 ... Fair
*2 Same as in Table 1.
*3 3 ... Excellent, 2 ... Good, 1 ... Fair.

TABLE 4

| | Outer Layer A | Intermediate Layer | | Outer Layer B | Ratio in*6 Thickness | Strength of Bag | | | | |
|---|---|---|---|---|---|---|---|---|---|---|
| | | HDPE*4 wt. part | LLDPE wt. part | | | Tensile Strength MD/TD kg/cm$^2$ | Tensile Modulus MD/TD kg/cm$^2$ | Elongation MT/TD % | Tear Strength MD/TD kg/cm | Puncture Strength kg·cm/cm |
| Example 24 | LLDPE*1 | 80 | 20 | LLDPE*1 | 2:6:2 | 360/430 | 6300/7000 | — | 25/52 | 11500 |

TABLE 4-continued

| | | | | | | | | | | |
|---|---|---|---|---|---|---|---|---|---|---|
| Example 25 | " | 60 | 40 | " | 2:6:2 | 350/420 | 5800/6100 | — | 32/78 | 13000 |
| Example 26 | " | 70 | 30 | LDPE*3 | 3:6:1 | 355/420 | 6000/6500 | 550/600 | 30/75 | 11500 |
| Example 27 | " | 85 | EPR*5 15 | LLDPE*1 | 3:6:1 | 350/430 | 5500/5800 | 580/600 | 35/60 | 12000 |
| Comparative Example 12 | LDPE*2 | 100 | 0 | " | 3:6:1 | 375/412 | 6880/7760 | 450/480 | 14/27 | 7000 |
| Comparative Example 13 | LLDPE*1 | 100 | 0 | " | 2:6:2 | 370/450 | 7000/8500 | — | 18/30 | 10000 |
| Comparative Example 14 | LDPE*2 | 100 | 0 | " | 2:6:2 | 380/410 | 6900/7700 | — | 14/27 | 7000 |
| Comparative Example 15 | " | 100 | 0 | " | 1:8:1 | 425/470 | 8200/9400 | — | 12/22 | — |
| Comparative Example 16 | LDPE*2 single layer | | | — | 230/220 | 2400/2800 | — | 45/60 | 10000 |
| Comparative Example 17 | LLDPE*1 single layer | | | — | 340/330 | 2400/2900 | — | 32/13 | 10500 |

| | Seal Strength | | Blocking*8 | |
|---|---|---|---|---|
| | kg · cm | Evaluation*7 | Resistance | Processability*8 |
| Example 24 | 7.2 | 3 | 3 | 3 |
| Example 25 | 8.0 | 3 | 3 | 3 |
| Example 26 | 6.0 | 3 | 3 | 3 |
| Example 27 | 7.0 | 3 | 3 | 3 |
| Comparative Example 12 | 0.8 | 1 | 1 | 3 |
| Comparative Example 13 | 6.0 | 3 | 3 | 3 |
| Comparative Example 14 | 1.0 | 1 | 1 | 3 |
| Comparative Example 15 | 0.8 | 1 | 1 | 3 |
| Comparative Example 16 | 4.0 | 3 | 1 | 3 |
| Comparative Example 17 | 6.0 | 3 | 3 | 2 |

*1Ethylene-butene-1 copolymer (density: 0.921 gram per cubic centimeter; MI: 3.7 grams per ten minutes; butene-1 content: 7.5% by weight)
*2High pressure-produced low density polyethylene (density: 0.924 grams per cubic centimeter; MI: 0.6 gram per ten minutes)
*3High pressure-produced low density polyethylene (density: 0.924 gram per cubic centimeter; MI: 3.0 grams per ten minutes)
*4High density polyethylene (density: 0.954 gram per cubic centimeter; MI: 0.05 gram per ten minutes; MFR: 100)
*5Ethylene-propylene rubber (Mooney viscosity $ML_{1+4}$ (100° C.): 60; propylene unit content: 2.7% by weight)
*6Ratio of Outer Layer A to Intermediate Layer to Outer Layer B
*7Same as in Table 3
*8Same as in Table 1

EXAMPLES 28 AND 29

Feed resins for outer layer A (corresponding to the innermost layer of the bag), an intermediate layer, and outer layer B (corresponding to the outermost layer) were each melted and kneaded in the respective extruders and extruded therefrom. The resulting extruded resins were introduced into a circular die, in which the layers are bonded each other. Thereafter, inflation processing was performed at a blow ratio of 1.5 to obtain a 120 micron-thick three layer film. The thus-produced film was tested for various physical properties, and the results are shown in Table 5. The physical properties were measured in the same manner as in Example 1.

COMPARATIVE EXAMPLES 18 AND 19

Each of 120 micron-thick single layer films of LDPE and LLDPE was tested, and the results are shown in Table 5.

TABLE 5

| | | | | | | Strength of Bag | | | | |
|---|---|---|---|---|---|---|---|---|---|---|
| | Outer Layer A | Intermediate Layer | | Outer Layer B | Ratio in Thickness*5 | Tensile Strength MD/TD kg/cm² | Tensile Modulus MD/TD kg/cm² | Tear Strength MD/TD kg/cm | Puncture Strength kg · cm/cm | Film Impact kg · cm/cm |
| | | HDPE*3 wt. part | LLDPE wt. part | | | | | | | |
| Example 28 | LLDPE*1 | 65 | 35 | LLDPE*2 | 4:4:2 | 380/390 | 5000/5780 | 60.9/195 | 11000 | 1350 |
| Example 29 | " | 80 | 20 | " | 4:4:2 | 340/360 | 4200/5110 | 54.6/180 | 10000 | 1300 |
| Comparative Example 18 | LDPE*4 single layer | | | | — | 258/233 | 2400/2480 | 26.3/31.1 | 9810 | 1000 |
| Comparative Example 19 | LLDPE*2 single layer | | | | — | 348/320 | 2780/3240 | 140/190 | 12000 | 1100 |

| | Seal Strength | | Blocking*7 | |
|---|---|---|---|---|
| | kg · cm | Evaluation*6 | Resistance | Processability*7 |
| Example 28 | 34.4 | 3 | 3 | 3 |
| Example 29 | 32.6 | 3 | 3 | 3 |
| Comparative Example 18 | 26.8 | 3 | 2 | 3 |
| Comparative | 27.6 | 3 | 2 | 2 |

TABLE 5-continued

Example 19

*[1] Ethylene-butene-1 copolymer (density: 0.920 gram per cubic centimeter; MI: 2.1 grams per ten minutes)
*[2] Ethylene-butene-1 copolymer (density: 0.926 gram per cubic centimeter; MI: 4.0 grams per ten minutes)
*[3] High density polyethylene (density: 0.950 gram per cubic centimeter; MI: 0.05 gram per ten minutes; MFR: 100)
*[4] High pressure-produced low density polyethylene (density: 0.920 gram per cubic centimeter; MI: 0.3 gram per ten minutes)
*[5] Ratio of Outer Layer A to Intermediate Layer to Outer Layer B
*[6] Same as in Table 3
*[7] Same as in Table 1

EXAMPLES 30 TO 32

Feed resins for outer layer A (corresponding to the innermost layer of the bag), an intermediate layer, and outer layer B (corresponding to the outermost layer) were each melted and kneaded in the respective extruders and extrude therefrom and air-cooled by the use of a double slit type air ring. Then, inflation processing was performed at a blow ratio of 4.0 and a frost line height of 100 millimeters to obtain a 40 micron-thick three layer film. The thus-produced film was tested for various physical properties, and the results are shown in Table 6.

COMPARATIVE EXAMPLES 20 TO 22

A single layer film and two layer film, all being 40 microns in thickness, were tested, and the results are shown in Table 6.

50 to 90% by weight of a high density polyethylene and from 50 to 10% by weight of an ethylene-α-olefin copolymer.

2. The bag as claimed in claim 1, wherein the low density ethylene-based polymer of the outer layer has a density of from 0.91 to 0.94 gram per cubic centimeter and a melt index of from 0.1 to 20 grams per ten minutes.

3. The bag as claimed in claim 2, wherein the low density ethylene-based copolymer of the outer layer has a density of from 0.915 to 0.938 gram per cubic centimeter and melt index of from 0.2 to 10 grams per ten minutes.

4. The bag as claimed in claim 1, wherein the low density ethylene-based polymer of the outer layer is a copolymer of ethylene and an α-olefin containing from 3 to 12 carbon atoms.

5. The bag as claimed in claim 4, wherein the amount of α-olefin of said copolymer of ethylene and α-olefin is from 1 to 20% by weight.

TABLE 6

| | Type of Resin | | | Ratio in Thickness | Tear Strength |
| | Outer Layer A | Intermediate Layer | | Outer Layer B | Outer Layer A/Intermediate Layer/Outer Layer B | MD/TD kg/cm*[5] |
|---|---|---|---|---|---|---|
| Example 30 | LLDPE-2*[4] | HDPE-1*[1] | 90 | LLDPE-2 | 2/6/2 | 9.5/145 |
| | | LLDPE-2*[4] | 10 | | | |
| Example 31 | " | HDPE-1 | 80 | " | 2/6/2 | 10.8/137 |
| | | LLDPE-2 | 20 | | | |
| Example 32 | " | HDPE-1 | 70 | " | 2/6/2 | 12.5/130 |
| | | LLDEP-2 | 30 | | | |
| Comparative Example 20 | — | HDPE-1 | | LLDPE-1*[3] | 0/8/2 | 3.2/158 |
| Comparative Example 21 | | HDPE-1 single layer | | | — | 2.8/160 |
| Comparative Example 22 | | HDPE-2*[2] single layer | | | — | 3.8/155 |

| | Impact Strength*[6] kg · cm/cm | Haziness*[7] % | Glossiness*[8] | Water-Vapor Permeability*[9] g/m² · 24 hour · 0.1 mm | Blocking Resistance*[10] |
|---|---|---|---|---|---|
| Example 30 | 1300 | 8.6 | 116 | 2.4 | 3*[11] |
| Example 31 | 1410 | 7.2 | 116 | 2.6 | 3 |
| Example 32 | 1480 | 6.3 | 117 | 2.8 | 3 |
| Comparative Example 20 | 710 | 52 | 110 | 2.2 | 3 |
| Comparative Example 21 | 590 | 60 | 50 | 2.0 | 3 |
| Comparative Example 22 | 3000 | 85 | 15 | 4.2 | 3 |

*[1] HDPE-1 (density: 0.954 gram per cubic centimeter; MI: 0.9 gram per ten minutes; MFR: 22)
*[2] HDPE-2 (density: 0.955 gram per cubic centimeter; MI: 0.05 gram per ten minutes; MFR: 100)
*[3] LLDPE-1 (density: 0.923 gram per cubic centimeter; MI: 2.4 grams per ten minutes; 4-methylpentene-1 copolymer)
*[4] LLDPE-2 (density: 0.935 gram per cubic centimeter; MI: 4.0 grams per ten minutes; octene-1 copolymer)
*[5] JIS Z 1702
*[6] Measured by the film impact method; a film was fixed in a ring form and punched by a pendulum with an impact head of 1 inch in size, and the energy for this punching was measured (a film impact tester manufactured by Toyo Seiki Seisakujo Co., Ltd. was used)
*[7] ASTM D 1003
*[8] ASTM D 523
*[9] JIS Z 0208 (40° C., 90% RH)
*[10] Films were superposed in such a manner that their outer surfaces came into contact with each other, which was then allowed to stand at 40° C. for 24 hours while applying a load of 100 grams per square centimeter. At the end of the time, the blocking of the films was evaluated by the organoleptic test.
*[11] The bag can be opened with ease

What is claimed is:

1. A packaging bag comprising an outer layer made of a low density ethylene-based polymer or a mixture of said ethylene-based polymer and an ethylene-vinyl acetate copolymer, and an inner layer made of a mixture of 6. The bag as claimed in claim 1, wherein the outer layer is a mixture of from 10 to 95% by weight of the low density polyethylene and from 90 to 5% by weight of the ethylene-vinyl acetate copolymer.

7. The bag as claimed in claim 6, wherein the amount of said low density polyethylene of said mixture is 60 to 90% by weight and the amount of said ethylene-vinyl acetate copolymer is 40 to 10% by weight.

8. The bag as claimed in claim 1, wherein the high density polyethylene of the inner layer has a density of from 0.94 to 0.97 gram per cubic centimeter and a melt index of from 0.01 to 4 grams per ten minutes.

9. The bag as claimed in claim 8, wherein the high density polyethylene of the outer layer has a density of 0.945 to 0.965 gram per cubic centimeter and a melt index of from 0.02 to 2.0 grams per ten minutes.

10. The bag as claimed in claim 1, wherein the ethylene-α-olefin copolymer of the inner layer has a density of from 0.91 to 0.94 gram per cubic centimeter and a melt index of from 0.3 to 10 grams per ten minutes.

11. The bag as claimed in claim 1, wherein the ethylene-α-olefin copolymer of the inner layer is an ethylene-propylene-based copolymer elastomer.

12. The bag as claimed in claim 11, wherein said ethylene-propylene-based copolymer elastomer has a Mooney viscosity of from 40 to 150.

13. The bag as claimed in claim 1, wherein said high density polyethylene is present in an amount of from 60 to 90% by weight and said ethylene-α-olefin copolymer is present in an amount of 40 to 10% by weight.

14. The bag as claimed in claim 1, wherein the ratio of the thickness of the outer layer to the inner layer is 1:99 to 60:40.

15. A packaging bag comprising an outer layer, an inner layer and an intermediate layer sandwiched between said outer and inner layers, said outer and inner layers each being made of a low density ethylene-based polymer or a mixture of said ethylene-based polymer and an ethylene-vinyl acetate copolymer, and said intermediate layer being made of a mixture of from 50 to 90% by weight of a high density polyethylene and from 50% to 10% by weight of an ethylene-α-olefin copolymer.

16. The bag as claimed in claim 15, wherein the low density ethylene-based polymer of the outer and inner layers has a density of from 0.91 to 0.94 gram per cubic centimeter and a melt index of from 0.1 to 20 grams per ten minutes.

17. The bag as claimed in claim 16, wherein the low density ethylene-based copolymer of the outer and inner layers has a density of from 0.915 to 0.938 gram per cubic centimeter and melt index of from 0.2 to 10 grams per ten minutes.

18. The bag as claimed in claim 15, wherein the low density ethylene-based polymer of the outer layer is a copolymer of ethylene and an α-olefin containing from 3 to 12 carbon atoms.

19. The bag as claimed in claim 18, wherein the amount of α-olefin of said copolymer of ethylene and α-olefin is from 1 to 20% by weight.

20. The bag as claimed in claim 15, wherein the outer layers are a mixture of from 10 to 95% by weight of the low density polyethylene and from 90 to 5% by weight of the ethylene-vinyl acetate copolymer.

21. The bag as claimed in claim 20, wherein the amount of said low density polyethylene of said mixture is 60 to 90% by weight and the amount of said ethylene-vinyl acetate copolymer is 40 to 10% by weight.

22. The bag as claimed in claim 15, wherein the high density polyethylene of the intermediate layer has a density of from 0.94 to 0.97 gram per cubic centimeter and a melt index of from 0.01 to 4 grams per ten minutes.

23. The bag as claimed in claim 22, wherein the high density polyethylene of the outer layer has a density of 0.945 to 0.965 gram per cubic centimeter and a melt index of from 0.02 to 2.0 grams per ten minutes.

24. The bag as claimed in claim 15, wherein the ethylene-α-olefin copolymer of the intermediate layer has a density of from 0.91 to 0.94 gram per cubic centimeter and a melt index of from 0.3 to 10 grams per ten minutes.

25. The bag as claimed in claim 15, wherein the ethylene-α-olefin copolymer of the intermediate layer is an ethylene-propylene-based copolymer elastomer.

26. The bag as claimed in claim 25, wherein said ethylene-propylene-based copolymer elastomer has a Mooney viscosity of from 40 to 150.

27. The bag as claimed in claim 15, wherein said high density polyethylene is present in an amount of from 60 to 90% by weight and said ethylene-α-olefin copolymer is present in an amount of 40 to 10% by weight.

28. The bag as claimed in claim 15, wherein the thickness of each of the outer layer and the inner layer is from 1 to 40% and the thickness of the intermediate layer is from 20 to 98% of the total thickness of the bag.

29. The bag as claimed in claim 28, wherein the thickness of the intermediate layer is 40 to 90% of the total thickness of the bag.

* * * * *